(12) United States Patent
Kiessling

(10) Patent No.: US 9,413,609 B2
(45) Date of Patent: Aug. 9, 2016

(54) COMMUNICATION DEVICE AND METHOD FOR TRANSMITTING MESSAGES IN A REDUNDANTLY OPERABLE INDUSTRIAL COMMUNICATION NETWORK

(71) Applicant: Marcel Kiessling, Cadolzburg (DE)

(72) Inventor: Marcel Kiessling, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 278 days.

(21) Appl. No.: 13/946,586

(22) Filed: Jul. 19, 2013

(65) Prior Publication Data

US 2014/0025833 A1 Jan. 23, 2014

(30) Foreign Application Priority Data

Jul. 20, 2012 (EP) .................................... 12177233

(51) Int. Cl.
*H04L 12/24* (2006.01)
*H04L 12/703* (2013.01)
*H04L 12/753* (2013.01)
*H04L 12/403* (2006.01)
*H04L 12/781* (2013.01)

(52) U.S. Cl.
CPC .......... *H04L 41/0836* (2013.01); *H04L 12/403* (2013.01); *H04L 45/28* (2013.01); *H04L 45/48* (2013.01); *H04L 45/52* (2013.01)

(58) Field of Classification Search
CPC ... H04L 12/403; H04L 41/0836; H04L 45/28; H04L 45/48; H04L 45/52
See application file for complete search history.

(56) References Cited

U.S. PATENT DOCUMENTS

| 7,379,429 | B1 * | 5/2008 | Thottakkara | 370/256 |
| 8,355,348 | B1 * | 1/2013 | Miller et al. | 370/256 |
| 2007/0008964 | A1 * | 1/2007 | Rose et al. | 370/389 |
| 2008/0146347 | A1 * | 6/2008 | Okada | 463/42 |
| 2009/0109841 | A1 * | 4/2009 | Nozaki et al. | 370/218 |
| 2010/0034143 | A1 * | 2/2010 | Cordeiro et al. | 370/328 |
| 2011/0317555 | A1 * | 12/2011 | Kleineberg et al. | 370/230 |

FOREIGN PATENT DOCUMENTS

| EP | 2 343 857 | | 7/2011 |
| WO | WO 2008037782 A1 * | 4/2008 |
| WO | WO 2008/119649 | | 10/2008 |
| WO | WO 2010/105828 | | 9/2010 |

* cited by examiner

*Primary Examiner* — Brian J Gillis
*Assistant Examiner* — Gil H. Lee
(74) *Attorney, Agent, or Firm* — Cozen O'Connor

(57) ABSTRACT

A method for transmitting messages in a redundantly operable communication network which includes a first subnetwork with a tree topology and a second subnetwork, wherein messages are transmitted in the first subnetwork in accordance with a spanning tree protocol. Here, communication devices associated with network nodes of the first subnetwork interchange messages containing topology information with one another to form a tree topology, messages are transmitted in the second subnetwork in accordance with a parallel or ring redundancy protocol, communication devices associated with network nodes of the second subnetwork interchange messages containing topology information for the first subnetwork with one another in accordance with the parallel or ring redundancy protocol and compare the messages with locally available topology information for the first subnetwork, and communication devices associated with network nodes of the second subnetwork determine resultant topology information for the first subnetwork based on a comparison result.

25 Claims, 5 Drawing Sheets

COMMUNICATION DEVICE AND METHOD FOR TRANSMITTING MESSAGES IN A REDUNDANTLY OPERABLE INDUSTRIAL COMMUNICATION NETWORK

BACKGROUND OF THE INVENTION

An industrial automation system usually comprises a multiplicity of automation devices networked to one another via an industrial communication network and, within the scope of production or process automation, is used to control or regulate installations, machines or devices. On account of time-critical boundary conditions in technical systems automated using industrial automation systems, real-time communication protocols, such as Profinet, Profibus or real-time Ethernet, are predominantly used in industrial communication networks for communication between automation devices.

Interruptions in communication connections between computer units of an industrial automation system or automation devices may result in undesirable or unnecessary repetition of the transmission of a service request. This causes additional utilization of communication connections of the industrial automation system, which may result in further system faults or errors. In addition, untransmitted messages or incompletely transmitted messages may prevent an industrial automation system from changing to or remaining in a safe operating state, for example. This may finally result in failure of a complete production installation and costly production downtime. A particular problem regularly results in industrial automation systems from message traffic with a comparatively large number of, but relatively short, messages, thus intensifying the above problems.

WO 2008/119649 A1 discloses a method for reconfiguring a packet-switched communication network comprising a first subnetwork and a second subnetwork. Whereas a first network protocol is used in the first subnetwork, a second network protocol different from the first network protocol is used in the second subnetwork. Both subnetworks are connected to one another over at least three redundant data links, only one of which is respectively activated for the purpose of interchanging useful data. Here, a master data link is activated in a preset manner, while at least two slave data links are deactivated in a preset manner. Failure of the master data link or a slave data link is monitored by a master bridge of the second subnetwork, which master bridge is connected to the master data link. In the event of such failure, the master bridge generates a first data packet and transmits this first data packet to a slave bridge of the second subnetwork, which slave bridge is connected to a slave data link. The slave bridge is selected by the master bridge according to a predefinable selection rule. The first data packet is then processed by the selected slave bridge. The first data packet comprises logical information that is used to at least partially execute the first network protocol on a port of the slave bridge connected to the slave data link and to activate the slave data link using the first network protocol executed on the port of the slave bridge.

EP 2 343 857 A1 describes a network node for a communication network comprising a first subnetwork and a second subnetwork connected to the latter. Whereas a spanning tree protocol is used in the first subnetwork, a second protocol that differs from the protocol of the first subnetwork is used in the second subnetwork. The network node is set up as an element for the second subnetwork and is designed for communication inside the second subnetwork. In addition, the network node is designed and set up as a spanning tree main node for monitoring and controlling the second subnetwork by a spanning tree functionality. The second subnetwork can therefore be treated as a virtual network node by the spanning tree protocol used in the first subnetwork by virtue of the network node, as the spanning tree main node, applying a spanning tree protocol for other network nodes of the second subnetwork.

WO 2010/105828 A1 discloses a method for operating a communication network which has redundancy properties and has a ring network topology. Inside the communication network, the data ports of communication devices are connected to one another via data lines and the communication devices interchange control data and useful data via the data lines based on communication protocols. In order to avoid endless circulation of messages in meshes of the communication network, the communication protocols are used to prevent transmission of messages via selected data ports of individual communication devices, with the exception of messages for controlling or monitoring media redundancy. Two different communication protocols are used in a parallel manner in the communication devices inside the communication network. Parallel use of the different communication protocols is achieved, for example, by allocating control of data ports to be blocked to an individual communication protocol. Alternatively, parameters may be selected for the communication protocols such that a first communication protocol does not block any connections that are considered to be active in accordance with a second communication protocol.

SUMMARY OF THE INVENTION

It is an object of the present invention to provide a method for transmitting messages in an industrial communication network which can be redundantly operated and has at least two subnetworks, which method makes it possible, when at least two different communication protocols are used, to rapidly activate replacement connections following device or connection failures, and of providing a communication device suitable for implementing the method.

This and other objects and advantages are achieved in accordance with the invention by a communication device and method in which messages are transmitted in a first subnetwork with a tree topology in accordance with a spanning tree protocol. In this case, communication devices associated with network nodes of the first subnetwork interchange messages containing topology information with one another to form a tree topology. A root network node is determined as the basic element of a tree topology by the communication devices associated with the network nodes of the first subnetwork based on the interchanged topology information. Loop-free connections are set up from the root network node to the remaining network nodes of the first subnetwork. Messages are transmitted in a second subnetwork in accordance with a parallel or ring redundancy protocol. The first and second subnetworks are coupled to one another via a plurality of communication devices. The communication devices associated with the network nodes of the first and second subnetworks are preferably switches or bridges. Communication devices associated with network nodes of the second subnetwork interchange messages containing topology information for the first subnetwork with one another in accordance with the parallel or ring redundancy protocol and compare the messages with locally available topology information for the first subnetwork. The communication devices associated with network nodes of the second subnetwork determine resultant topology information for the first subnetwork based on a comparison result. In addition, the communication devices associated with the network nodes of the second subnetwork use the determined resultant topology information for the first subnetwork to adapt their configuration with respect to closed and/or open connections to the first subnetwork.

According to the invention, the resultant topology information for the first subnetwork is consistently determined by all communication devices associated with the network nodes of the second subnetwork in accordance with another embodiment. In addition, the resultant topology information is consistently provided for communication devices associated with network nodes of the first subnetwork for use of the spanning tree protocol in the first subnetwork.

In contrast to conventional approaches, there is no parallel use of a spanning tree protocol and a parallel or ring redundancy protocol inside the second subnetwork according to the invention. Messages are preferably transmitted between communication devices associated with the network nodes of the second subnetwork solely in accordance with the parallel or ring redundancy protocol. Therefore, there is no need to form a tree topology for the second subnetwork using a spanning tree protocol. This decisively contributes to rapidly activating replacement connections following device or connection failures. In addition, the spanning tree protocol and the parallel or ring redundancy protocol are used in the respective subnetwork in a manner substantially decoupled from one another. The second subnetwork, for use of the spanning tree protocol in the first subnetwork, is preferably represented by an individual communication device that connects network nodes to one another in the first subnetwork. Overall use of the spanning tree protocol in the first subnetwork appears to be transparent to communication devices in the second subnetwork, and overall use of the spanning tree protocol in the second subnetwork appears transparent to communication devices in the first subnetwork. Such decoupling is achieved by tunneling topology information for the first subnetwork through the second subnetwork and by adjusting the topology information to form resultant topology information in the sense of deriving the best information. This resultant topology information can in turn be used for use of the spanning tree protocol in the first subnetwork.

According to one preferred embodiment of the method according to the invention, the topology information for the first subnetwork comprises details of existing connections between network nodes of the first subnetwork, and loop-free connections from the root network node to the remaining network nodes of the first subnetwork are set up using a determination of minimum path costs to the root network node.

The spanning tree protocol may be, for example, the spanning tree protocol according to Institute of Electrical and Electronic Engineers (IEEE) Standard 802.1d, the rapid spanning tree protocol according to IEEE 802.1w or the multiple spanning tree protocol according to IEEE 802.1s. The messages containing topology information for the first subnetwork are, for example, bridge protocol data units (BPDU) or preferably each comprise a port priority vector that is interchanged and compared among communication devices associated with the network nodes of the second subnetwork.

The parallel or ring redundancy protocol is, for example, the parallel redundancy protocol according to International Electrotechnical Commission (IEC) 62439-3, clause 4, the high-availability seamless redundancy protocol according to IEC 62439-3, clause 5, or the media redundancy protocol according to IEC 62439. When the high-availability seamless redundancy protocol is used as the ring redundancy protocol, the communication devices associated with the network nodes of the second subnetwork preferably each comprise at least one first transmitting and receiving unit and one second transmitting and receiving unit each having an interface for a network connection of the second subnetwork. The second subnetwork has a ring topology in this case. Furthermore, both transmitting and receiving units have an identical network address and preferably an identical device identifier. In addition, a signal processing unit is advantageously connected to each of the first and second transmitting and receiving units, which signal processing unit forwards messages to be transmitted to both transmitting units in a parallel manner and detects redundant messages received by the receiving units. In addition, a coupling element is preferably connected to each of the signal processing units and is used to connect a simply connected network node or a redundancy-free subnetwork to the signal processing unit. According to another embodiment of the method according to the invention, messages which are redundant with respect to one another are identified by a consistent sequence number, sequence numbers of messages which have already been received in an error-free manner being stored in a memory unit associated with the signal processing unit. The signal processing unit, upon receiving a new message, can therefore check its sequence number for a match with a sequence number which has already been stored.

When the media redundancy protocol is used as the ring redundancy protocol according to another advantageous embodiment of the present invention, a communication device in the second subnetwork is configured as a monitoring and control unit. Here, the second subnetwork has a ring topology. The monitoring and control unit detects an interruption inside the ring topology using transmitted test data packets and controls forwarding of data packets containing useful data, which are addressed to a first terminal connection of the communication device configured as a monitoring and control unit, to a second terminal connection of this communication device.

The communication device according to the invention is intended and configured for an industrial communication network which can be redundantly operated and comprises a first subnetwork with a tree topology and message transmission in accordance with a spanning tree protocol, a second subnetwork and message transmission in accordance with a parallel or ring redundancy protocol and a plurality of communication devices which couple both subnetworks. Provided as means for transmitting messages inside the second subnetwork in accordance with the parallel or ring redundancy protocol are, for example, a first transmitting and receiving unit and a second transmitting and receiving unit, a signal processing unit with a multiplexer unit and a redundancy handling unit and a coupling element which is connected to the signal processing unit. The coupling element is preferably a high-speed bus which can be used to connect, for example, simply connected network nodes or redundancy-free subnetworks to the signal processing unit. In particular, the coupling element may be a backplane switch with an associated controller. Alternatively, the coupling element may also be implemented, in principle, using a matrix combinational circuit. The signal processing unit is preferably implemented using a field programmable gate array (FPGA).

Furthermore, the communication device according to the invention comprises a device for interchanging messages containing topology information for the first subnetwork with further communication devices associated with network nodes of the second subnetwork in accordance with the parallel or ring redundancy protocol. This device may comprises, for example, the first and second transmitting and receiving units, the signal processing unit, the coupling element and a protocol wrapper associated with the signal processing unit.

According to the invention, the topology information is intended to determine a root network node as the basic element of the tree topology. Here, the root network node forms a starting point for setting up loop-free connections to the remaining network nodes of the first subnetwork. A device for comparing interchanged messages containing topology information for the first subnetwork with locally available topology information for the first subnetwork and for determining resultant topology information for the first subnetwork based on a comparison result is additionally provided. This device may comprises, for example, the signal processing unit.

In addition, the communication device according to the invention comprises a device for adapting its configuration with respect to closed and/or open connections to the first subnetwork using the determined resultant topology information for the first subnetwork. This device may comprise, for example, a controller of the coupling element. The communication device according to the invention is preferably configured to transmit messages inside the second subnetwork solely in accordance with the parallel or ring redundancy protocol. Therefore, the spanning tree protocol and the parallel or ring redundancy protocol can be used in the respective subnetwork in a manner substantially decoupled from one another. This enables considerably reduced recovery times following device or connection failures.

The parallel or ring redundancy protocol may be, for example, the parallel redundancy protocol, the high-availability seamless redundancy protocol or the media redundancy protocol. If the ring redundancy protocol is the high-availability seamless redundancy protocol, the communication devices associated with the network nodes of the second subnetwork preferably each comprise at least one first transmitting and receiving unit and one second transmitting and receiving unit each having an interface for a network connection of the second subnetwork. In this case, the second subnetwork has a ring topology. Furthermore, both transmitting and receiving units have an identical network address and an identical device identifier. A signal processing unit is preferably connected to the first and second transmitting and receiving units, which signal processing unit comprises a multiplexer unit for forwarding messages to be transmitted to both transmitting units in a parallel manner and a redundancy handling unit for processing messages received by both receiving units. In addition, the redundancy handling unit preferably has a filter unit to detect received redundant messages. In addition, a coupling element can be connected to the signal processing unit and is used to connect, for example, a simply connected network node or a redundancy-free subnetwork to the signal processing unit.

According to another embodiment of the communication device according to the invention, messages which are redundant with respect to one another are identified by a consistent sequence number. Here, the signal processing unit is preferably associated with a memory unit which is configured to store sequence numbers of messages that have already been received in an error-free manner. The redundancy handling unit is advantageously configured to check for a sequence number that has already been stored when a new message is received.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE PREFERRED EMBODIMENTS

Figure 1:
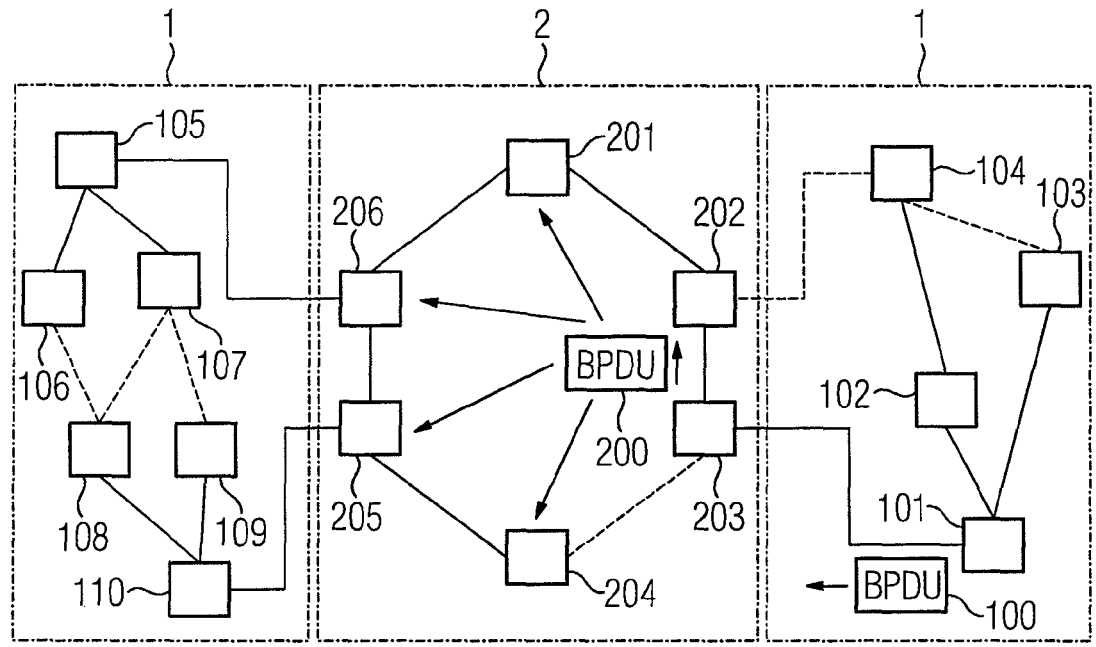
FIG. 1 shows an industrial communication network which can be redundantly operated and comprises a first subnetwork with a tree topology and a second subnetwork with a ring topology, in an error-free connection state in accordance with the invention.

The industrial communication network illustrated in FIG. 1 comprises a first subnetwork 1 with a tree topology and message transmission in accordance with a spanning tree protocol and a second subnetwork 2 with a ring topology and message transmission in accordance with a ring redundancy protocol. Messages between communication devices 201-206 associated with network nodes of the second subnetwork 2 are transmitted solely in accordance with the ring redundancy protocol.

The first subnetwork 1 and the second subnetwork 2 are coupled to one another via a plurality of communication devices 101, 104, 105, 110, 202, 203, 205, 206. In order to avoid undesirable loop connections, only three connections between the communication devices 101, 104, 105, 110, 202, 203, 205, 206 are activated in the present exemplary embodiment. Deactivated connections are represented by dashed lines in the figures, while solid lines symbolize activated connections. This applies to both subnetworks 1, 2.

Communication devices 101-110 associated with network nodes of the first subnetwork 1 interchange messages 100 containing topology information with one another to form a tree topology and determine a root network node as the basic element of a tree topology using the interchanged topology information. In the present exemplary embodiment, the spanning tree protocol is the rapid spanning tree protocol. However, the comments below equally apply to the spanning tree protocol, the multiple spanning tree protocol or comparable spanning tree protocols. In the present exemplary embodiment, the network node associated with the communication device 101 has been determined as the root network node using a node identifier and associated priority according to the rapid spanning tree protocol. The communication device 101 is therefore a root bridge. The messages 100 containing topology information for the first subnetwork 1 which are interchanged between the communication devices 101-110 of the first subnetwork 1 may be, for example, bridge protocol data units (BPDU) which are used by the communication devices 101-110 of the first subnetwork 1 to configure their port states. Connections between network nodes, in particular, are activated or deactivated by configuring the port states.

Loop-free connections are set up from the root network node to the remaining network nodes of the first subnetwork 1. This also applies to transit connections through the second subnetwork 2 with a ring topology. For this purpose, communication devices 201-206 associated with network nodes of the second subnetwork 2 interchange messages 200 containing topology information for the first subnetwork 1 with one another in accordance with the ring redundancy protocol and compare the messages with locally available topology information for the first subnetwork. In the present exemplary embodiment, the messages 200 containing topology information for the first subnetwork 1 that are interchanged between the communication devices 201-206 of the second subnetwork 2 each comprise a port priority vector, from the comparison of which all communication devices 201-206 consistently determine a root priority vector as the resultant topology information for the first subnetwork 1 based on a comparison result. The communication devices 201-206 associated with the network nodes of the second subnetwork 2 use the determined resultant topology information for the first subnetwork 1 to adapt their configuration with respect to closed and/or open connections to the first subnetwork 1. The communication devices 101-110, 201-206 associated with the network nodes of the first subnetwork 1 and of the second subnetwork 2 are switches or bridges in the present exemplary embodiment.

The resultant topology information for the first subnetwork 1, as consistently determined by the communication devices 201-206 of the second subnetwork 2, is also made available to the communication devices 101-110 of the first subnetwork 1 for use of the spanning tree protocol in the first subnetwork 1. Therefore, the second subnetwork 2, for use of the spanning tree protocol in the first subnetwork 1, can be represented by an individual communication device which connects network nodes to one another, i.e., by a functional Rapid Spanning Tree Protocol (RSTP) bridge, in the first subnetwork 1. Therefore, the transit connections through the second subnetwork 2 are transparent to the communication devices of the first subnetwork 1.

The topology information for the first subnetwork 1 comprises, in particular, details of existing connections between network nodes of the first subnetwork 1 and their path costs. The communication devices 101-110 of the first subnetwork 1 set up loop-free connections from the root network node to the remaining network nodes of the first subnetwork 1 in an autonomous/interacting manner based on a determination of minimum path costs to the root network node. Further details of this can be gathered, for example, from IEEE 802.1w with respect to the rapid spanning tree protocol.

Figure 2:
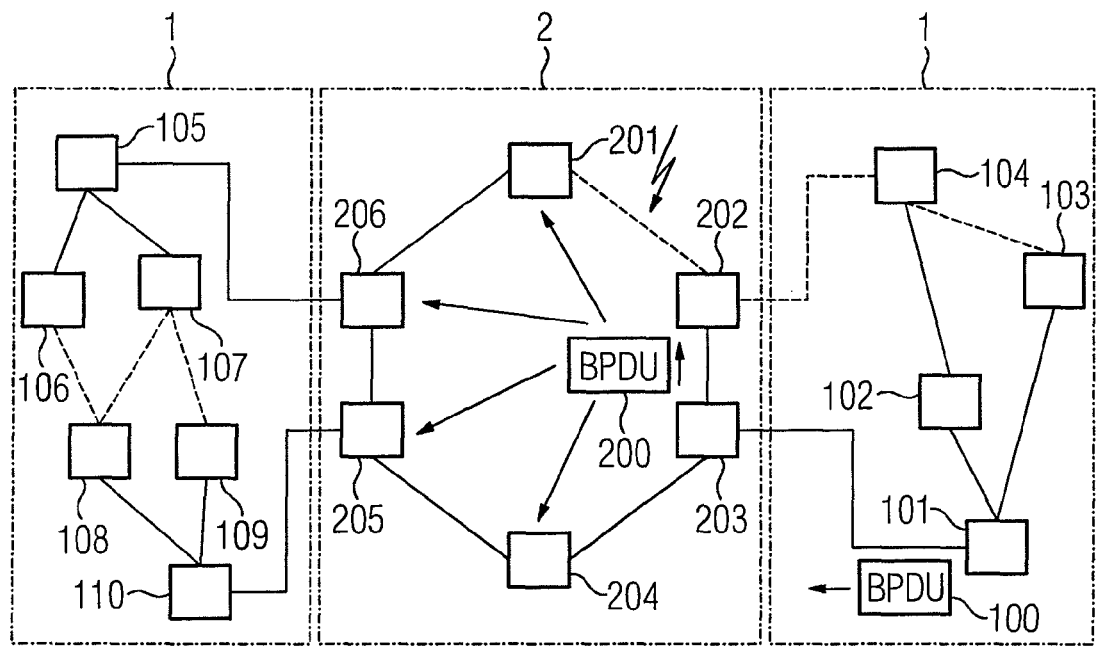
FIG. 2 shows the communication network of FIG. 1 in a state with a connection error in the second subnetwork.
Figure 3:
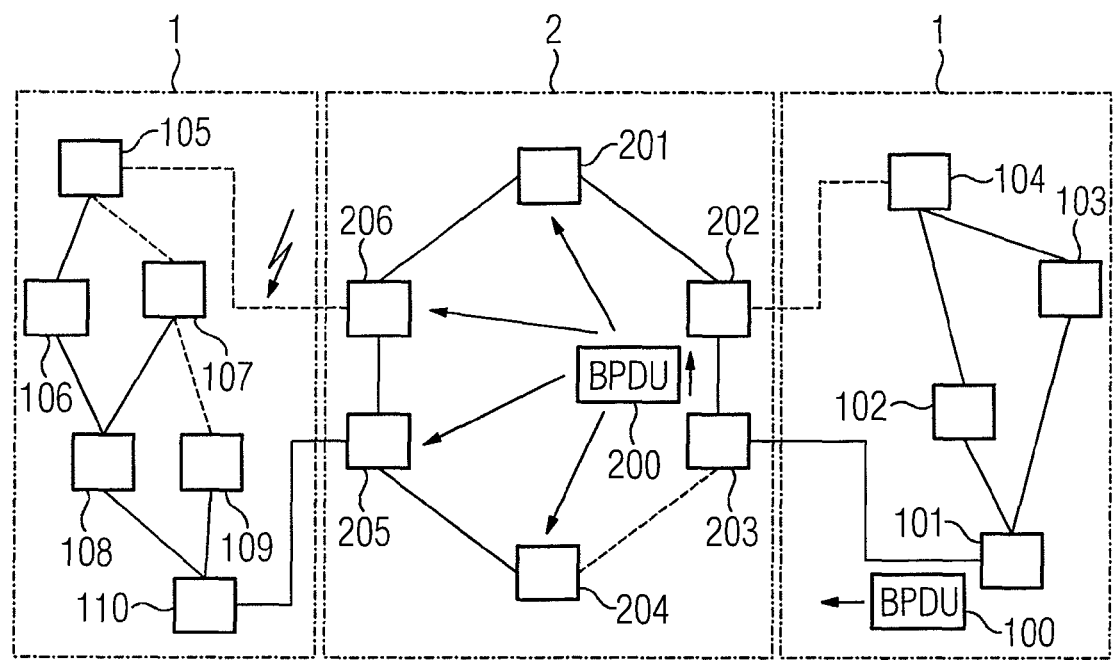
FIG. 3 shows the communication network of FIG. 1 in a state with a connection error in the first subnetwork.

In an error-free connection state, the connections between the communication devices 103 and 104, 104 and 202, 203 and 204, 106 and 108, 107 and 108 and 107 and 109 are deactivated in order to avoid loop connections in accordance with FIG. 1. In the event of a connection error in the second subnetwork 2 between the communication devices 201 and 202, as illustrated in FIG. 2, the connection between the communication devices 203 and 204 is activated in accordance with the ring redundancy protocol used in the second subnetwork 2 without this affecting the first subnetwork 1. In a corresponding manner, a connection error between the communication devices 206 and 105, as illustrated in FIG. 3, also does not have any far-reaching consequences for the second subnetwork 2. This is because only the connection between the communication devices 205 and 110 remains activated in accordance with the spanning tree protocol used in the first subnetwork 1 for the purpose of handling errors, without this affecting the remaining communication devices 201-204, 206. Further error-handling measures, namely activation of the connections between the communication devices 106 and 108 and 107 and 108 and deactivation of the connection between the communication devices 105 and 107, remain restricted to the first subnetwork 1. Error handling can therefore always be implemented, in principle, in the subnetwork directly affected by an error or a fault based on a communication protocol used there.

Figure 4:
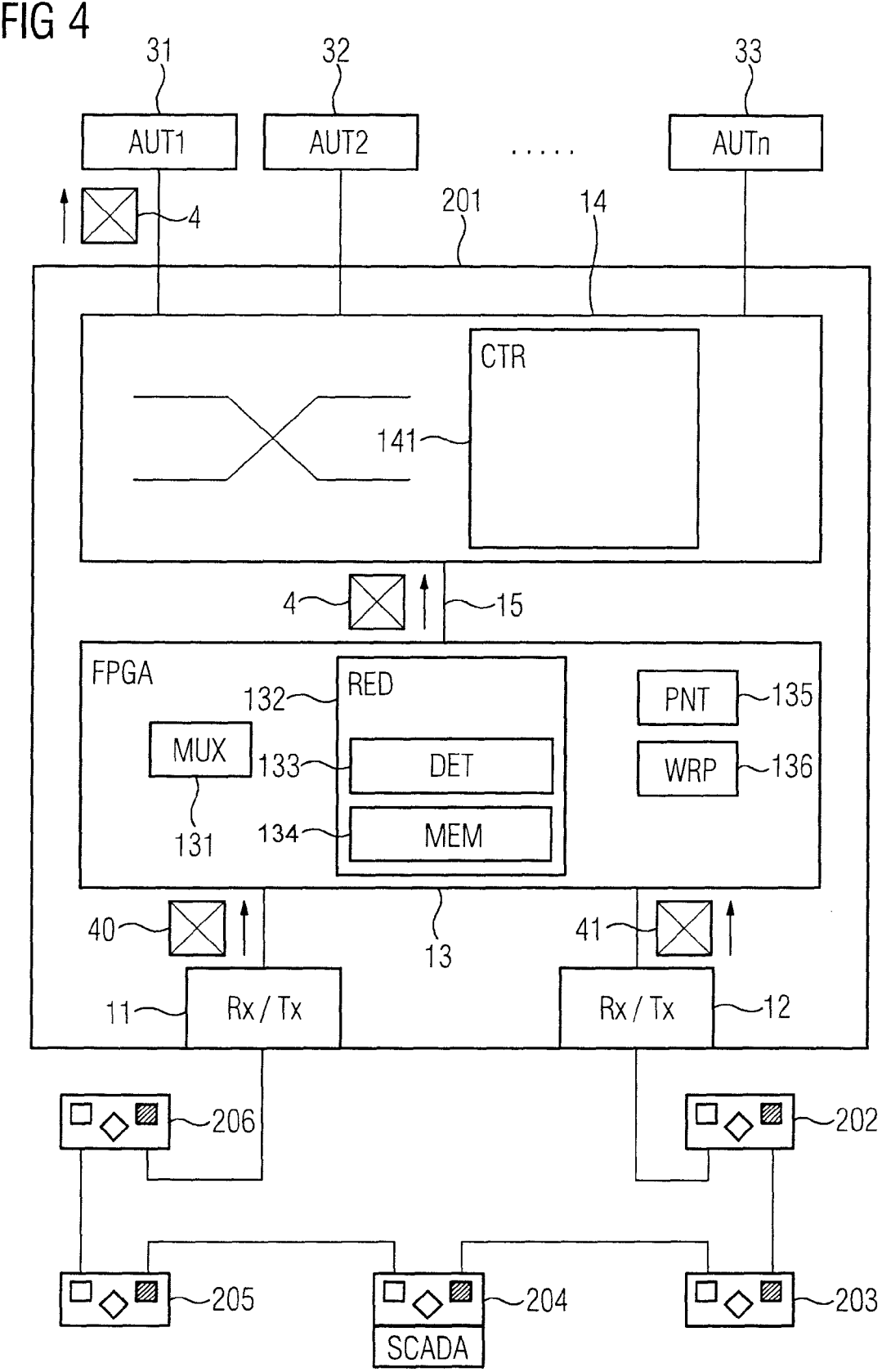
FIG. 4 shows a communication device associated with a network node of the second subnetwork in accordance with the invention.

FIG. 4 illustrates, in more detail, a communication device 201 which is associated with a network node of the second subnetwork 2 and is connected to further communication devices 202-206 in a ring structure. In principle, the remaining communication devices 202-206 of the second subnetwork 2 may also have an identical structure. A communication device 204 may be associated with a supervisory control and data acquisition (SCADA) system of an industrial production or process automation system, for example.

As means for transmitting messages inside the second subnetwork, the communication device 201 comprises at least one first transmitting and receiving unit 11 and one second transmitting and receiving unit 12, a signal processing unit 13 with a multiplexer unit 131 and a redundancy handling unit 132 and a coupling element 14 which is connected to the signal processing unit 13. Both transmitting and receiving units 11, 12 have an identical network address and an identical MAC device identifier. However, when using a PC-based solution with two communication network expansion cards, they may have different MAC addresses. In this case, one of the two MAC addresses is consistently used by both expansion cards as a common MAC address for transmitting and receiving operations.

The multiplexer unit 131 is used to forward data packets to be transmitted to both transmitting units 11, 12 in a parallel manner, while the redundancy handling unit 132 is intended to process data packets 40, 41 received by both receiving units 11, 12. In addition, the redundancy handling unit 132 comprises a filter unit 133 which is configured to detect received redundant data packets.

In the present exemplary embodiment, the signal processing unit is implemented using a field programmable gate array (FPGA). The coupling element 14 is a backplane switch with an associated controller and connects a plurality of automation devices 31, 32, 33 to the signal processing unit 13. Furthermore, the coupling element 14 is connected to the automation devices 31, 32, 33 via a respective interlink terminal connection. The signal processing unit 13 has a memory unit 134 that stores a table (proxy node table) containing details of all automation devices 31, 32, 33 connected to the coupling element 14.

As means for interchanging messages 200 containing topology information for the first subnetwork 1 in accordance with the ring redundancy protocol, the communication device 201 illustrated in FIG. 4 comprises the first transmitting and receiving unit 11 and the second transmitting and receiving unit 12, the signal processing unit 13, the coupling element 14 and a protocol wrapper 136 associated with the signal processing unit. In addition, the signal processing unit 13 is intended to compare interchanged messages 200 containing topology information for the first subnetwork 1 with topology information locally available in the communication device 201. In the present exemplary embodiment, the signal processing unit 13 is also configured and set up to determine resultant topology information for the first subnetwork 1 based on a comparison result.

In addition, the controller 141 of the coupling element 14 is advantageously intended to adapt the configuration of the communication device 201 with respect to closed and/or open connections to the first subnetwork 1. In this case, the configuration is adapted using the determined resultant topology information for the first subnetwork 1.

The communication device 201 is preferably configured to transmit messages both in accordance with the high-availability seamless redundancy protocol and in accordance with the media redundancy protocol. For message transmission in accordance with the high-availability seamless redundancy protocol, the redundancy handling unit 132 comprises a memory unit 134 which is configured to store sequence numbers of messages that have already been received in an error-free manner. Upon receiving a new message, the redundancy handling unit 132 can therefore check its sequence number for a match with a sequence number that has already been stored and can possibly reject redundant messages that are identified by a consistent sequence number and can accordingly be detected.

Figure 5:
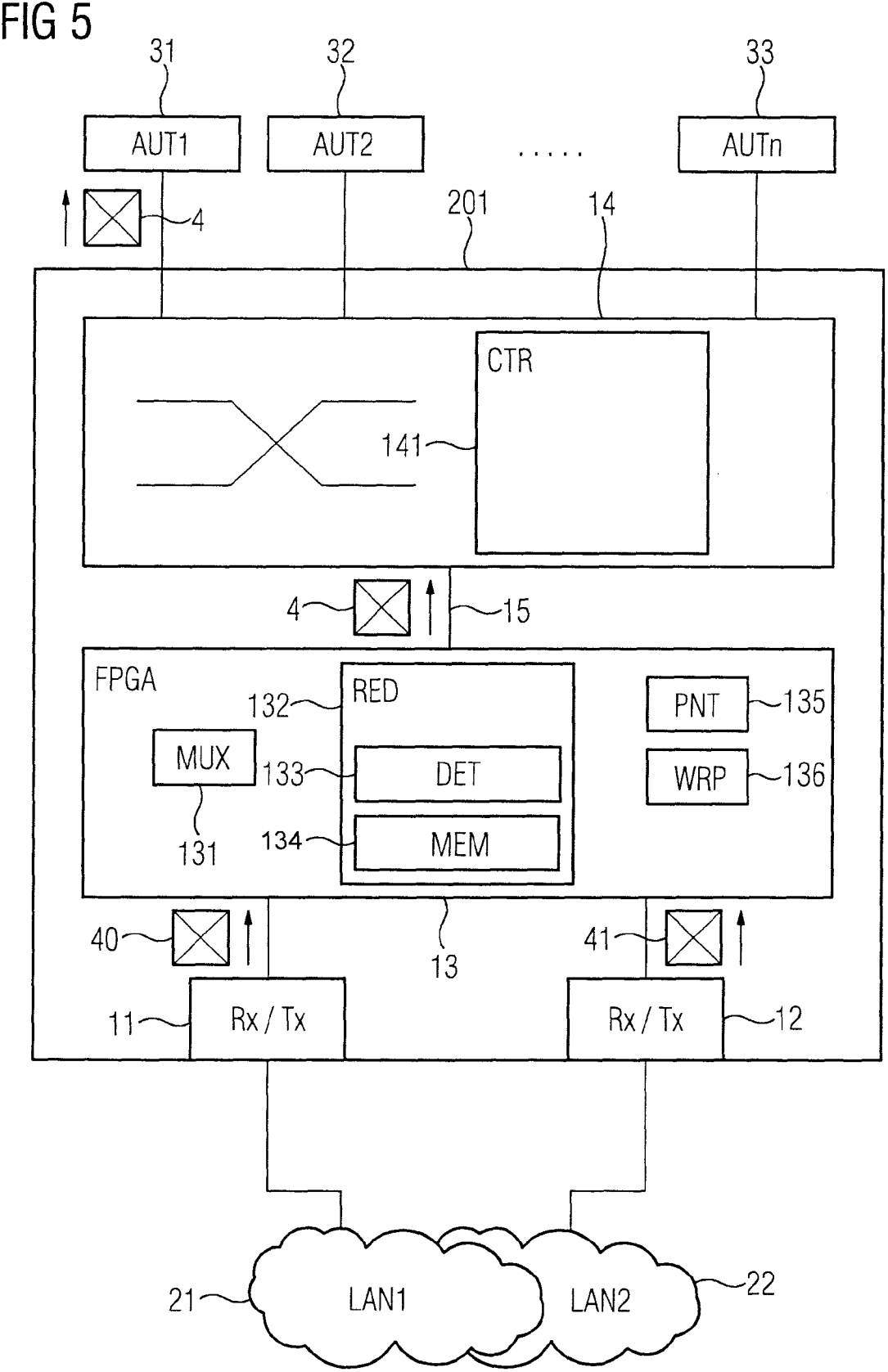
FIG. 5 shows a communication device associated with a network node of a subnetwork in which a parallel redundancy protocol is used in accordance with the invention.

The features of the exemplary embodiments described above can be implemented both individually and in the described combination with one another. In particular, use of the present invention is not restricted to a second subnetwork in which a ring redundancy protocol is used, but rather the above comments analogously also apply to a second subnetwork in which a parallel redundancy protocol is used. FIG. 5 illustrates, by way of example, a communication device 201 for a second subnetwork in which the parallel redundancy protocol is used. In this case, the second subnetwork comprises, for example, two local area networks 21, 22 that are redundant with respect to one another and to which a transmitting and receiving unit 11, 12 of the communication device 201 illustrated in FIG. 5 is respectively connected, which communication device, for the rest, comprises corresponding components to those in the communication device 201 illustrated in FIG. 4. These include, in particular, a signal processing unit 13 with a multiplexer unit 131, a redundancy handling unit 132, a memory unit 134 for a proxy node table and a protocol wrapper 135 as well as a coupling element 14 with an associated controller. With regard to their functionality, these components correspond to those of the communication device illustrated in FIG. 4, applied to the parallel redundancy protocol.

Figure 6:
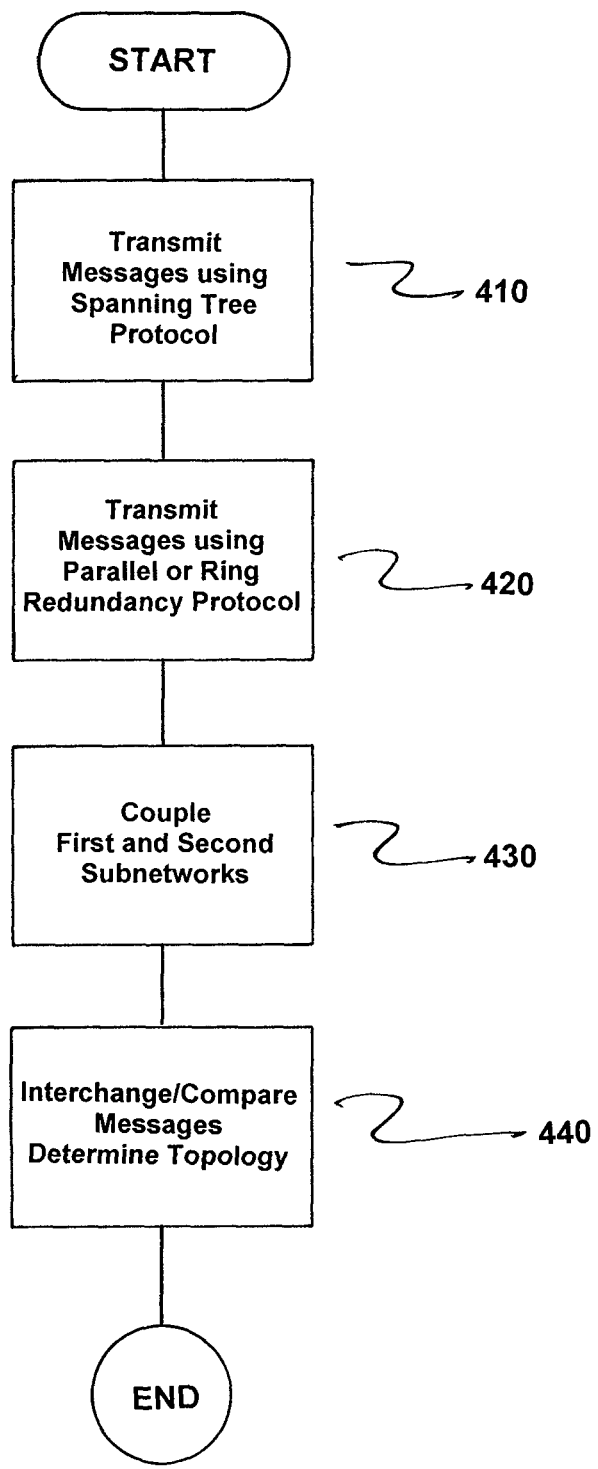
FIG. 6 is a flowchart of the method in accordance with the invention.

FIG. 6 is a flowchart of a method for transmitting messages in a redundantly operable industrial communication network. The method comprises transmitting messages in a first subnetwork with a tree topology in accordance with a spanning tree protocol, as indicated in step 410. Here, communication devices associated with network nodes of the first subnetwork interchange messages containing topology information with one another to form a tree topology, a root network node is determined as a basic element of the tree topology by the communication devices associated with the network nodes of the first subnetwork based on the interchanged topology information, and loop-free connections are set up from the root network node to remaining network nodes of the first subnetwork.

Next, messages in a second subnetwork are transmitted in accordance with a parallel or ring redundancy protocol, as indicated in step 420. The first and second subnetworks are then coupled to one another via a plurality of communication devices, as indicated in step 430. Messages containing topology information for the first subnetwork are next interchanged with one another by communication devices associated with network nodes of the second subnetwork in accordance with the parallel or ring redundancy protocol, the messages are compared with locally available topology information for the first subnetwork and resultant topology information is determined for the first subnetwork based on a comparison result, as indicated in step 440.

In accordance with the method of the invention, the communication devices associated with the network nodes of the second subnetwork utilize the determined resultant topology information for the first subnetwork to adapt their configuration with respect to at least one of closed connections to the first subnetwork and open connections to the first subnetwork, the resultant topology information for the first subnetwork is consistently determined by all communication devices associated with the network nodes of the second subnetwork, and the communication devices associated with the network nodes of the second subnetwork provide consistent resultant topology information for utilization by the spanning tree protocol in the first subnetwork.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting messages in a redundantly operable industrial communication network, comprising:
   transmitting messages in a first subnetwork with a tree topology in accordance with a spanning tree protocol, communication devices associated with network nodes of the first subnetwork interchanging messages containing topology information with one another to form a tree topology, a root network node being determined as a basic element of the tree topology by the communication devices associated with the network nodes of the first subnetwork based on the interchanged topology information, and loop-free connections being set up from the root network node to remaining network nodes of the first subnetwork;
   transmitting messages in a second subnetwork of the industrial communication network in accordance with a parallel or ring redundancy protocol in accordance with one of (i) International Electrotechnical Commission (IEC) 62439-3, clause 4, (ii) high-availability seamless redundancy protocol in accordance with IEC 62439-3, clause 5 and (iii) media redundancy protocol in accordance with IEC 62439;
   coupling the first and second subnetworks to one another via a plurality of communication devices;
   interchanging, by communication devices associated with network nodes of the second subnetwork, messages containing topology information for the first subnetwork with one another in accordance with the parallel or ring redundancy protocol, comparing said messages with locally available topology information for the first subnetwork, and determining resultant topology information for the first subnetwork based on a comparison result;

wherein the communication devices associated with the network nodes of the second subnetwork utilize the determined resultant topology information for the first subnetwork to adapt their configuration with respect to at least one of closed connections to the first subnetwork and open connections to the first subnetwork;

wherein the resultant topology information for the first subnetwork is consistently determined by all communication devices associated with the network nodes of the second subnetwork;

wherein the communication devices associated with the network nodes of the second subnetwork provide consistent resultant topology information for utilization by the spanning tree protocol in the first subnetwork; and wherein error handling is implemented in a subnetwork directly affected by an error or a fault based on a communication protocol implemented in the directly affected subnetwork without affecting another subnetwork.

2. The method as claimed in claim 1, wherein the topology information for the first subnetwork comprises details of existing connections between network nodes of the first subnetwork; and wherein loop-free connections from the root network node to the remaining network nodes of the first subnetwork are set up using a determination of minimum path costs to the root network node.

3. The method as claimed in claim 1, wherein the messages are transmitted between communication devices associated with the network nodes of the second subnetwork only in accordance with the parallel or ring redundancy protocol.

4. The method as claimed in claim 2, wherein the messages are transmitted between communication devices associated with the network nodes of the second subnetwork only in accordance with the parallel or ring redundancy protocol.

5. The method as claimed in claim 1, wherein the second subnetwork, for use of the spanning tree protocol in the first subnetwork, is represented by an individual communication device which connects network nodes to one another in the first subnetwork.

6. The method as claimed in claim 1, wherein the spanning tree protocol is one of a rapid spanning tree protocol and a multiple spanning tree protocol.

7. The method as claimed in claim 6, wherein the messages containing topology information for the first subnetwork are bridge protocol data units.

8. The method as claimed in claim 6, wherein the messages containing topology information for the first subnetwork each comprise a port priority vector which is interchanged and compared among communication devices associated with the network nodes of the second subnetwork.

9. The method as claimed in claim 7, wherein the messages containing topology information for the first subnetwork each comprise a port priority vector which is interchanged and compared among communication devices associated with the network nodes of the second subnetwork.

10. The method as claimed in claim 1, wherein the communication devices associated with the network nodes of at least one of the first subnetwork and the second subnetwork comprises switches or bridges.

11. The method as claimed in claim 1, wherein the parallel or ring redundancy protocol comprises one of a parallel redundancy protocol, a high-availability seamless redundancy protocol and a media redundancy protocol.

12. The method as claimed in claim 11, wherein the second subnetwork includes a ring topology;

wherein one of the parallel and ring redundancy protocol is the high-availability seamless redundancy protocol;

wherein the communication devices associated with the network nodes of the second subnetwork each comprise at least one first transmitting and receiving unit and one second transmitting and receiving unit each having an interface for a network connection of the second subnetwork, both transmitting and receiving units having an identical network address and an identical device identifier;

wherein a signal processing unit is connected to each of the first and second transmitting and receiving units, the signal processing unit forwarding messages to be transmitted to both transmitting units in a parallel manner and detecting redundant messages received by the receiving units; and wherein a coupling element is connected to each of the signal processing units and is used to connect one of a simply connected network node and a redundancy-free subnetwork to the signal processing unit.

13. The method as claimed in claim 12, wherein messages which are redundant with respect to one another are identified by a consistent sequence number;

wherein sequence numbers of messages which have already been received in an error-free manner are stored in a memory unit associated with the signal processing unit; and wherein the signal processing unit, upon receiving a new message, checks its sequence number for a match with a sequence number which has already been stored.

14. The method as claimed in claim 11, wherein the second subnetwork has a ring topology;

wherein the parallel or ring redundancy protocol is the media redundancy protocol; and wherein a communication device in the second subnetwork is configured as a monitoring and control unit which detects an interruption inside the ring topology using transmitted test data packets and controls forwarding of data packets containing useful data, the data packets being addressed to a first terminal connection of the communication device configured as a monitoring and control unit, to a second terminal connection of this communication device.

15. A communication device for a redundantly operable industrial communication network comprising a first subnetwork with a tree topology and message transmission in accordance with a spanning tree protocol, a second subnetwork with message transmission in accordance with a parallel or ring redundancy protocol and a plurality of communication devices which couple both subnetworks, the communication device comprising:

means for transmitting messages inside the second subnetwork of the industrial communication network in accordance with the parallel or ring redundancy protocol in accordance with one of (i) International Electrotechnical Commission (IEC) 62439-3, clause 4, (ii) high-availability seamless redundancy protocol in accordance with IEC 62439-3, clause 5 and (iii) media redundancy protocol in accordance with IEC 62439;

means for interchanging messages containing topology information for the first subnetwork with further communication devices associated with network nodes of the second subnetwork in accordance with the parallel or ring redundancy protocol, the topology information determining a root network node as the basic element of the tree topology, and the root network node forming a starting point for setting up loop-free connections to remaining network nodes of the first subnetwork;

means for comparing interchanged messages containing topology information for the first subnetwork with locally available topology information for the first subnetwork and for determining resultant topology information for the first subnetwork based on a comparison result; and means for adapting a configuration of the communication device with respect to one of closed connections to the first subnetwork and open connections to the first subnetwork using a determined resultant topology information for the first subnetwork;

wherein error handling is implemented in a subnetwork directly affected by an error or a fault based on a communication protocol implemented in the directly affected subnetwork without affecting another subnetwork.

16. The communication device as claimed in claim 15, wherein the communication device is configured to transmit messages inside the second subnetwork solely in accordance with the parallel or ring redundancy protocol.

17. The communication device as claimed in claim 15, wherein the spanning tree protocol is a rapid spanning tree protocol or a multiple spanning tree protocol.

18. The communication device as claimed in claim 16, wherein the spanning tree protocol is one of a rapid spanning tree protocol or a multiple spanning tree protocol.

19. The communication device as claimed in claim 17, wherein the messages containing topology information for the first subnetwork are bridge protocol data units.

20. The communication device as claimed in claim 17, wherein the messages containing topology information each comprise a port priority vector which is interchanged and compared among communication devices associated with the network nodes of the second subnetwork.

21. The communication device as claimed in claim 19, wherein the messages containing topology information each comprise a port priority vector which is interchanged and compared among communication devices associated with the network nodes of the second subnetwork.

22. The communication device as claimed in claim 15, wherein the communication devices associated with the network nodes of at least one of the first subnetwork and the second subnetwork are switches or bridges.

23. The communication device as claimed in claim 15, wherein the parallel or ring redundancy protocol is one of a parallel redundancy protocol, a high-availability seamless redundancy protocol and a media redundancy protocol.

24. The communication device as claimed in claim 23, wherein the second subnetwork has a ring topology;

wherein the parallel or ring redundancy protocol is the high-availability seamless redundancy protocol;

wherein the communication devices associated with the network nodes of the second subnetwork each comprise at least one first transmitting and receiving unit and one second transmitting and receiving unit each having an interface for a network connection of the second subnetwork, both transmitting and receiving units having an identical network address and an identical device identifier;

wherein a signal processing unit is connected to each of the first and second transmitting and receiving units;

wherein the signal processing unit includes a multiplexer unit for forwarding messages to be transmitted to both transmitting units in a parallel manner and a redundancy handling unit for processing messages received by both receiving units, the redundancy handling unit comprising a filter unit which is set up to detect received redundant messages; and wherein a coupling element is connected to each of the signal processing units and is utilized to connect one of a simply connected network node and a redundancy-free subnetwork to the signal processing unit.

25. The communication device as claimed in claim 24, wherein messages which are redundant with respect to one another are identified by a consistent sequence number;

wherein the signal processing unit is associated with a memory unit which is configured to store sequence numbers of messages which have already been received in an error-free manner; and wherein the redundancy handling unit is configured to check for a sequence number which has already been stored when a new message is received.

* * * * *